United States Patent
Zhang et al.

(10) Patent No.: US 9,693,322 B2
(45) Date of Patent: Jun. 27, 2017

(54) METHOD AND DEVICE FOR ADJUSTING TRANSMISSION POWER

(71) Applicant: Xiaomi Inc., Beijing (CN)

(72) Inventors: Pengfei Zhang, Beijing (CN); Yong Chen, Beijing (CN); Yidong Wang, Beijing (CN); Tiejun Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 97 days.

(21) Appl. No.: 14/743,054

(22) Filed: Jun. 18, 2015

(65) Prior Publication Data

US 2016/0081041 A1 Mar. 17, 2016

Related U.S. Application Data

(63) Continuation of application No. PCT/CN2015/074444, filed on Mar. 18, 2015.

(30) Foreign Application Priority Data

Sep. 11, 2014 (CN) .......................... 2014 1 0459320

(51) Int. Cl.
*H04B 7/00* (2006.01)
*H04W 52/28* (2009.01)
*H04W 52/22* (2009.01)

(52) U.S. Cl.
CPC ......... *H04W 52/281* (2013.01); *H04W 52/22* (2013.01)

(58) Field of Classification Search
CPC ............. H04W 52/02; H04W 52/0203; H04W 52/0206; H04W 52/0248
USPC ................................ 370/310, 311, 328, 338
See application file for complete search history.

(56) References Cited

U.S. PATENT DOCUMENTS

| | | | |
|---|---|---|---|
| 8,229,430 B1 | 7/2012 | Singh et al. | |
| 8,903,448 B2* | 12/2014 | Chande | H04W 52/143 370/318 |
| 9,218,031 B2* | 12/2015 | Sultenfuss | H02J 7/025 |
| 9,439,153 B1* | 9/2016 | Vivanco | H04W 52/18 |
| 9,503,992 B2* | 11/2016 | Brown | H04W 52/281 |
| 2003/0060168 A1* | 3/2003 | Teibel | H04W 36/16 455/69 |
| 2003/0100312 A1 | 5/2003 | Takahashi | |
| 2005/0136961 A1 | 6/2005 | Simonsson et al. | |

(Continued)

FOREIGN PATENT DOCUMENTS

| | | |
|---|---|---|
| CN | 101959296 A | 1/2011 |
| CN | 103415066 A | 11/2013 |

(Continued)

OTHER PUBLICATIONS

International Search Report of PCT Application No. PCT/CN2015/074444, mailed Jun. 26, 2015, issued by the State Intellectual Property Office of P.R. China as ISA (4 pages).

(Continued)

*Primary Examiner* — Dmitry H Levitan
(74) *Attorney, Agent, or Firm* — Finnegan, Henderson, Farabow, Garrett & Dunner LLP (57) ABSTRACT

A method for adjusting transmission power of a gateway device includes acquiring an access device identity, acquiring a predetermined wireless transmission power corresponding to the access device identity, and adjusting a current transmission power of the gateway device according to the predetermined wireless transmission power.

17 Claims, 6 Drawing Sheets

(56) References Cited

U.S. PATENT DOCUMENTS

| | | | |
|---|---|---|---|
| 2011/0194543 A1 | 8/2011 | Zhao et al. | |
| 2015/0061398 A1* | 3/2015 | Kudo | H04B 5/0031 307/104 |
| 2015/0223285 A1* | 8/2015 | Ljung | H04W 52/0209 370/311 |
| 2016/0056966 A1* | 2/2016 | Bell | H04L 12/10 713/310 |

FOREIGN PATENT DOCUMENTS

| | | | |
|---|---|---|---|
| CN | 103619058 A | 3/2014 | |
| CN | 104270806 A | 1/2015 | |
| JP | 08-275234 A | 10/1996 | |
| JP | 2004-194133 A | 7/2004 | |
| JP | 2014-060672 A | 4/2014 | |
| RU | 2 417 550 C2 | 4/2011 | |
| RU | 2 430 489 C2 | 9/2011 | |

OTHER PUBLICATIONS

Cisco Systems, Inc., "Wireless Device Profiling and Policy Classification Engine on WLC", Aug. 2014, http://www.cisco.com/c/en/us/td/docs/wireless/controller/technotes/7-5/NativeProfiling75.pdf, retrieved on Nov. 12, 2015.

Extended European Search Report for European Application No. 15 18 3930 issued Nov. 23, 2015.

English version of International Search Report of PCT Application No. PCT/CN2015/074444, mailed Jun. 26, 2015, issued by the State Intellectual Property Office of P.R. China.

Russian Office Action for Russian Application No. 2015121325/07(033172), dated Jun. 1, 2016.

* cited by examiner

METHOD AND DEVICE FOR ADJUSTING TRANSMISSION POWER

CROSS-REFERENCE TO RELATED APPLICATIONS

This application is a continuation of International Application No. PCT/CN2015/074444, filed Mar. 18, 2015, which is based upon and claims priority to Chinese Patent Application No. 201410459320.3, filed Sep. 11, 2014, the entire contents of both of which are incorporated herein by reference.

TECHNICAL FIELD

The present disclosure relates to network devices and, more particularly, to a method and a device for adjusting transmission power.

BACKGROUND

Electronic devices and smart household appliances in a house can usually be connected to a router through a WIFI (WIreless-FIdelity) network. Generally, the router can broadcast a WIFI signal. When an electronic device receives the WIFI signal, it can send a wireless access request to the router, and access the WIFI network provided by the router after the router validates the wireless access request.

SUMMARY

In accordance with the present disclosure, there is provided a method for adjusting transmission power of a gateway device. The method includes acquiring an access device identity, acquiring a predetermined wireless transmission power corresponding to the access device identity, and adjusting a current transmission power of the gateway device according to the predetermined wireless transmission power.

Also in accordance with the present disclosure, there is provided a device for adjusting transmission power. The device includes a processor and a non-transitory computer-readable storage medium storing instructions. The instructions, when executed by the processor, cause the processor to acquire an access device identity, acquire a predetermined wireless transmission power corresponding to the access device identity, and adjust a current transmission power of the gateway device according to the predetermined wireless transmission power.

Also in accordance with the present disclosure, there is provided a non-transitory computer-readable storage medium storing instructions. The instructions, when executed by a processor in a gateway device, cause the gateway device to acquire an access device identity, acquire a predetermined wireless transmission power corresponding to the access device identity, and adjust a current transmission power of the gateway device according to the predetermined wireless transmission power.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Specific embodiments of the present disclosure have been shown through the accompanying drawings above, and will be described in detail hereinafter. The accompanying drawings and text descriptions are not intended to limit the scope of the conception of the present disclosure through any manner, but to explain the concept of the present disclosure for those skilled in the art with reference to specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise specified. The implementations set forth in the following description of exemplary embodiments do not represent all implementations consistent with the invention. Instead, they are merely examples of devices and methods consistent with some aspects related to the invention as recited in the appended claims.

In the present disclosure, unless otherwise specified, transmission power refers to the transmission power of a gateway device while providing a wireless network, which corresponds to a signal intensity of a signal received by an electronic device. The gateway device may be a router or a switch.

Figure 1:
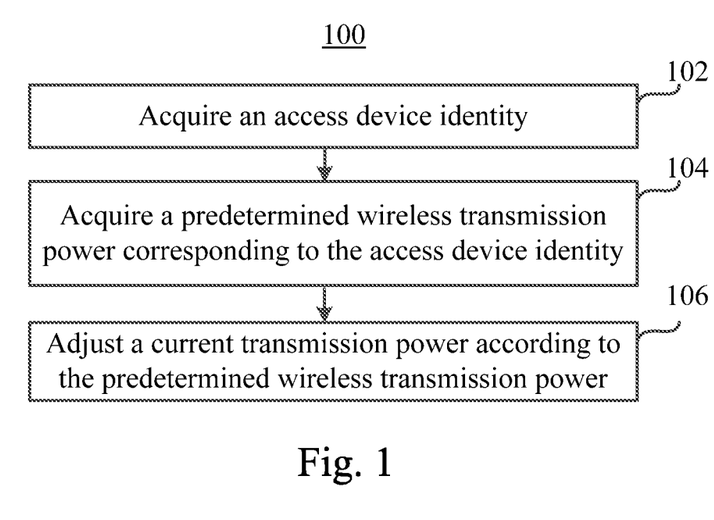
FIG. 1 is a flow chart of a method for adjusting transmission power, according to an exemplary embodiment.

FIG. 1 is a flow chart of an exemplary method 100 for adjusting transmission power consistent with embodiments of the present disclosure. The method 100 can be implemented in, for example, a gateway device. As shown in FIG. 1, at 102, an access device identity is acquired. At 104, a predetermined wireless transmission power corresponding to the access device identity is acquired. Each access device identity corresponds to one predetermined wireless transmission power. At 106, a current transmission power is adjusted according to the predetermined wireless transmission power.

Figure 2A:
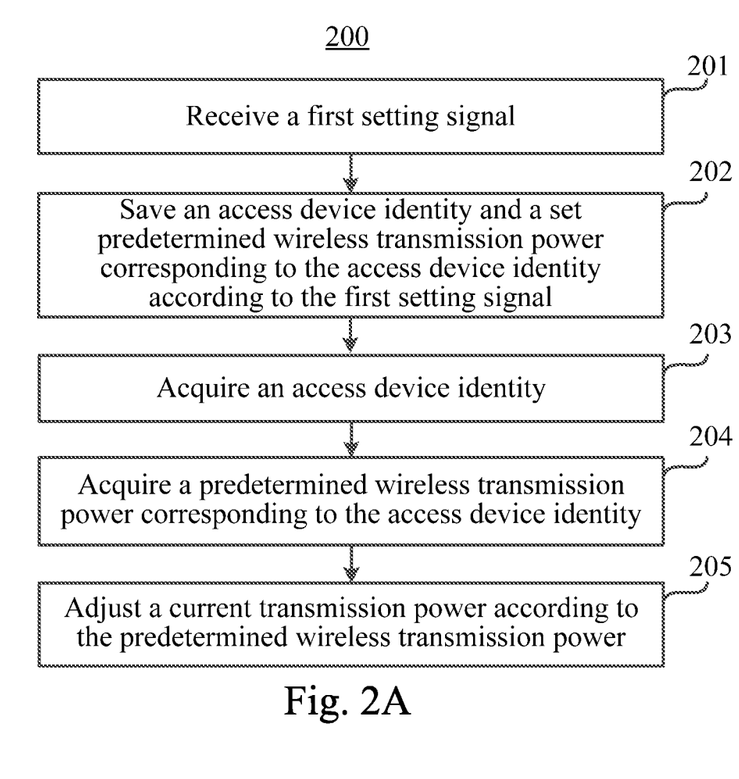
FIG. 2A is a flow chart of a method for adjusting transmission power, according to another exemplary embodiment.

FIG. 2A is a flow chart of another exemplary method 200 for adjusting transmission power consistent with embodiments of the present disclosure. The method 200 can be implemented in, for example, a router.

As shown in FIG. 2A, at 201, the router receives a first setting signal, which is configured to set a wireless transmission power corresponding to an access device identity.

For instance, a user can log in and manage the router through a webpage or a mobile client. The user sends the first setting signal to the router through the webpage or the mobile client. For example, the first setting signal is configured to set the wireless transmission power, that corresponds to a mobile phone associated with an access device identity A, to be a.

As another example, the router provides five optional wireless transmission power levels in advance, which are shown in Table 1.

TABLE 1

| Wireless transmission power level | Wireless transmission power | Suggestions |
| --- | --- | --- |
| Stronger | a mW | Recommended in the case of far distance, many obstacles |
| Strong | b mW | Recommended in the case of relatively far distance, some obstacles |
| Intermediate | c mW | Recommended in the case of intermediate distance, no obstacle, ordinary person(s) |
| Weak | d mW | Recommended in the case of close distance, ordinary person(s) |
| Weaker | e mW | Recommended in the case of close distance, elderly, infirm, sick, disabled, or pregnant person(s) |

The user may select a corresponding wireless transmission power level for the access device according to the scenario in which the access device is used. The wireless transmission power corresponding to the selected wireless transmission power level is used as the wireless transmission power corresponding to the access device.

At 202, the router saves the access device identity and the set predetermined wireless transmission power corresponding to the access device identity according to the first setting signal. For example, as shown in Table 2, the router saves the access device identity i.e., Mobile Phone A and the set predetermined wireless transmission power a corresponding to the access device identity, Mobile Phone A according to the first setting signal. One example is shown in Table 2.

TABLE 2

| Access device identity | Predetermined wireless transmission power |
| --- | --- |
| Mobile Phone A | a |

At 203, when an electronic device is connected to a wireless network of the router, the router acquires an access device identity of the electronic device. The access device identity may be an MAC address of the access device.

In some embodiments, each time an access device is successfully connected to the wireless network, the router acquires the access device identity of each access device that has been connected to the wireless network.

In some embodiments, the router acquires the access device identity of each access device that has been connected to the wireless network after every predetermined time interval. The predetermined time interval may be preset in the router, or be set by the user according to use conditions.

At 204, the router acquires a predetermined wireless transmission power corresponding to the access device identity. According to the present disclosure, different access device identities may correspond to the same predetermined wireless transmission power or different predetermined wireless transmission powers.

For example, the access device is Mobile Phone A. The router acquires the predetermined wireless transmission power corresponding to Mobile Phone A by, for example, an inquiry of Table 2. According to Table 2, the predetermined wireless transmission power corresponding to Mobile Phone A is a mW.

At 205, the router adjusts a current transmission power of the router according to the acquired predetermined wireless transmission power. The router may adjust the current transmission power directly according to the acquired predetermined wireless transmission power. Alternatively, the router may check with the user and adjust the current transmission power according to feedback from the user.

To check with the user, the router sends an adjustment request to the access device corresponding to the access device identity or an administrator device. The administrator device is, for example, a particular terminal preset by the user. The access device or the administrator device returns an adjustment response according to the adjustment request.

Figure 2B:
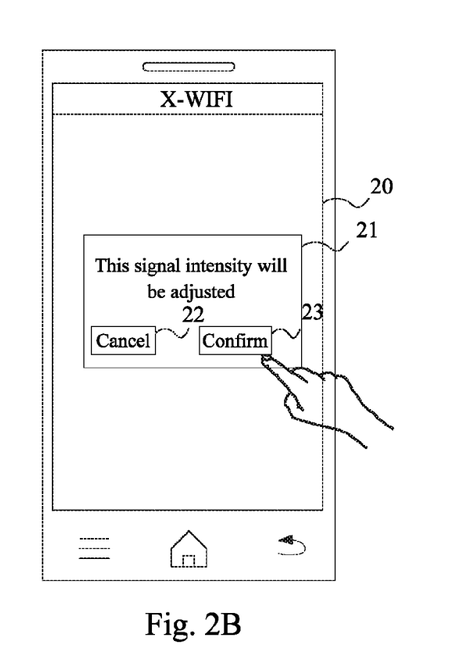
FIG. 2B is a block diagram of an interface related to the method for adjusting transmission power, according to another exemplary embodiment.

For instance, as shown in FIG. 2B, Mobile Phone A receives an adjustment request 21 sent by the router, and displays the adjustment request 21 in an interface 20 of Mobile Phone A. If the user taps a "Cancel" button 22, the adjustment is denied. If the user taps a "Confirm" button 23, the adjustment is allowed.

Figure 2C:
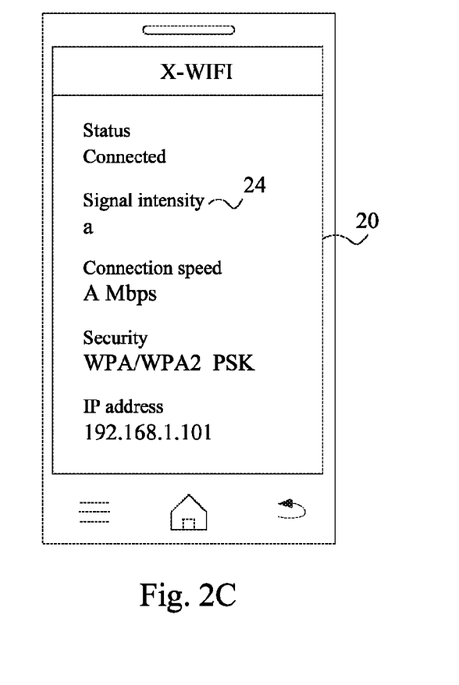
FIG. 2C is a block diagram of another interface related to the method for adjusting transmission power, according to another exemplary embodiment.

When receiving the adjustment response indicating that the adjustment is allowed, the router adjusts the current transmission power to the predetermined wireless transmission power. The signal intensity shown on the access device is adjusted accordingly. For instance, as shown in FIG. 2C, a signal intensity 24 displayed in the interface 20 of Mobile Phone A is adjusted to a.

Figure 3:
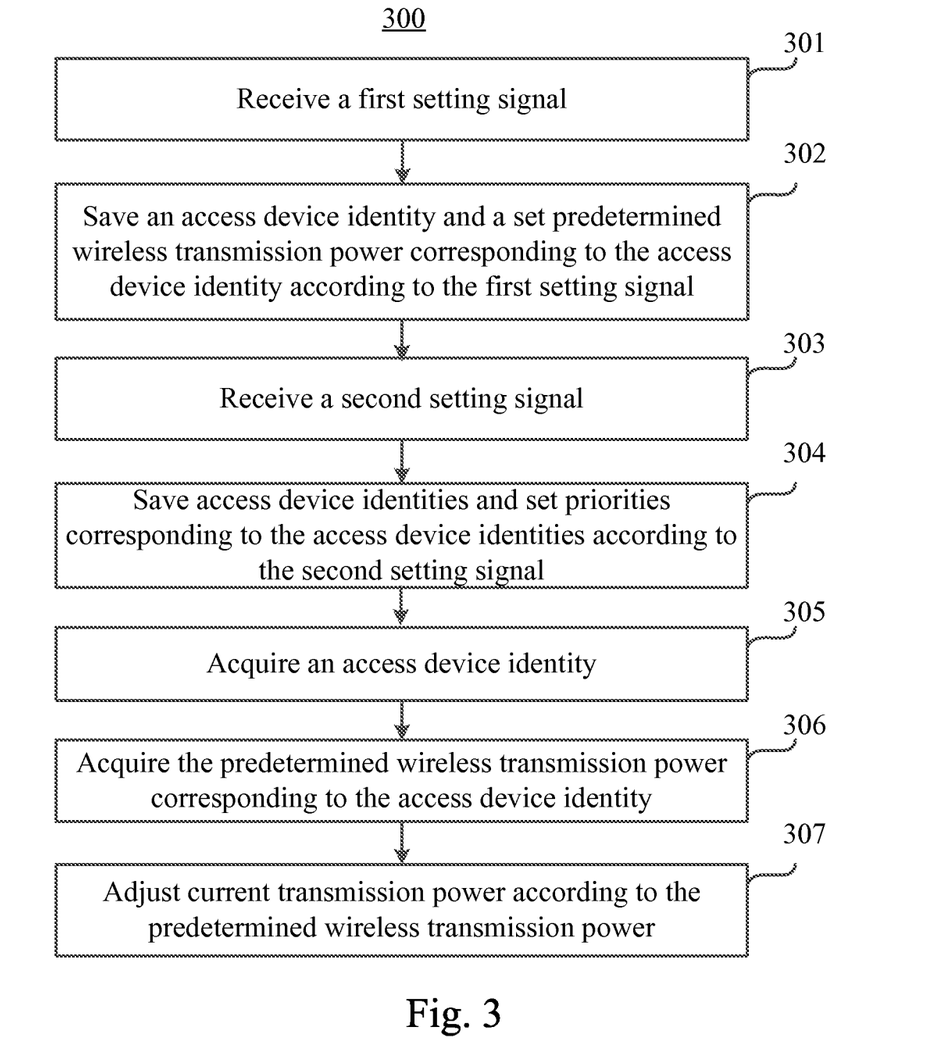
FIG. 3 is a flow chart of a method for adjusting transmission power, according to another exemplary embodiment.

FIG. 3 is a flow chart of another exemplary method 300 for adjusting transmission power consistent with embodiments of the present disclosure. The method 300 can be implemented in, for example, a router.

As shown in FIG. 3, at 301, the router receives a first setting signal. 301 in the method 300 is similar to 201 in the method 200, and thus detailed description thereof is omitted here.

In some embodiments, there are two or more access devices, such as Mobile Phone A, Tablet B, Access Device 001, Access Device 002, and Access Device 003. The user may set, in the first signal, a wireless transmission power corresponding to Mobile Phone A as a, a wireless transmission power corresponding to Tablet B as b, a wireless transmission power corresponding to Access Device 001 as c, a wireless transmission power corresponding to Access Device 002 as d, and a wireless transmission power corresponding to Access Device 003 as e.

At 302, the router saves the access device identity and the set predetermined wireless transmission power corresponding to the access device identity according to the first setting signal.

For instance, according to the first setting signal, the router saves Mobile Phone A and the corresponding predetermined wireless transmission power a, saves Tablet B and the corresponding predetermined wireless transmission power b, saves Access Device 001 and the corresponding predetermined wireless transmission power c, saves Access Device 002 and the corresponding predetermined wireless transmission power d, and saves Access Device 003 and the corresponding predetermined wireless transmission power e, as shown in Table 3 below.

TABLE 3

| Access device identity | Predetermined wireless transmission power |
| --- | --- |
| Mobile Phone A | a mW |
| Tablet B | b mW |
| Access Device 001 | c mW |
| Access Device 002 | d mW |
| Access Device 003 | e mW |

At 303, the router receives a second setting signal, which is configured to set priorities to the access device identities, as shown in Table 4 below.

TABLE 4

| Access device identity | Priority |
| --- | --- |
| Mobile Phone A | High |
| Tablet B | Highest |
| Access Device 001 | Low |
| Access Device 002 | Lower |
| Access Device 003 | Lowest |

At 304, the router saves the access device identities and the corresponding priorities according to the second setting signal.

At 305, when an electronic device is connected to a wireless network of the router, the router acquires an access device identity of the electronic device. 305 in the method 300 is similar to 203 in the method 200, and thus detailed description thereof is omitted here.

At 306, the router acquires the predetermined wireless transmission power corresponding to the access device identity.

In some embodiments, when there are two or more access device identities, the router inquires a priority corresponding to each access device identity. For example, five access devices are simultaneously connected to the router through the wireless network. Table 5 shows the access device identities, and the predetermined wireless transmission power and priority corresponding to each access device identity.

TABLE 5

| Access device identity | Predetermined wireless transmission power | Priority |
| --- | --- | --- |
| Mobile Phone A | a | High |
| Tablet B | b | Highest |
| Access Device 001 | c | Low |
| Access Device 002 | d | Lower |
| Access Device 003 | e | Lowest |

The router then acquires the access device identity having the highest priority, and acquires the predetermined wireless transmission power corresponding to the access device identity having the highest priority. For example, as shown in Table 5, the router acquires the predetermined wireless transmission power b corresponding to the access device having the highest priority, i.e., Tablet B.

At 307, the router adjusts the current transmission power according to the predetermined wireless transmission power. The router may adjust the current transmission power directly according to the acquired predetermined wireless transmission power. Alternatively, the router may check with the user and adjust the current transmission power according to the feedback of the user.

To check with the user, the router sends an adjustment request to the access device corresponding to, for example, the access device identity having the highest priority, or an administrator device. The administrator device is, for example, a particular terminal preset by the user. The access device or the administrator device returns an adjustment response according to the adjustment request.

For instance, after Tablet B receives the adjustment request sent by the router, a prompt window is displayed in an interface of Tablet B. If the user taps a "Cancel" button, the adjustment is denied. If the user taps a "Confirm" button, the adjustment is allowed.

When receiving the adjustment response indicating that the adjustment is allowed, the router adjusts the current transmission power to the predetermined wireless transmission power. For instance, when the adjustment response sent by Tablet B indicates that the adjustment is allowed, the router adjusts the current transmission power to the predetermined wireless transmission power. In some embodiments, if the current transmission power of the router and the inquired predetermined wireless transmission power are the same, then the router does not need to adjust the current transmission power.

Figure 4:
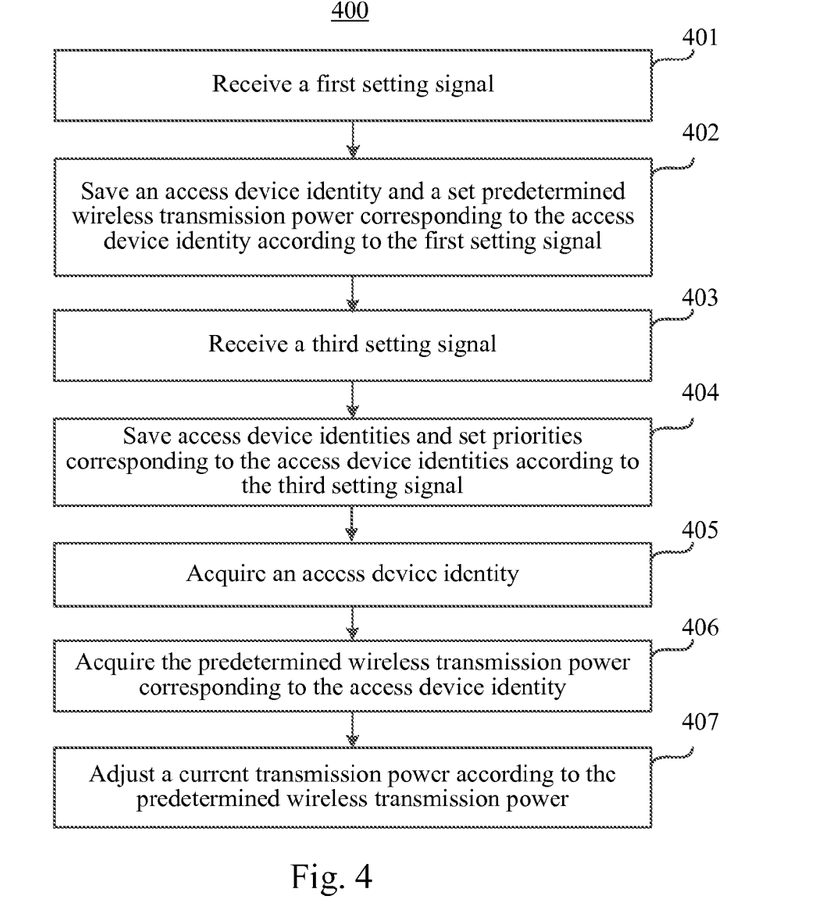
FIG. 4 is a flow chart of a method for adjusting transmission power, according to another exemplary embodiment.

FIG. 4 is a flow chart of another exemplary method 400 for adjusting transmission power consistent with embodiments of the present disclosure. The method 400 can be implemented in, for example, a router.

As shown in FIG. 4, at 401, the router receives a first setting signal. 401 in the method 400 is similar to 201 in the method 200, and thus detailed description thereof is omitted here.

In some embodiments, there are two or more access devices, such as Mobile Phone A, Tablet B, Computer F, and Network TV G. The user may set, in the first signal, a wireless transmission power corresponding to Mobile Phone A as a, a wireless transmission power corresponding to Tablet B as b, a wireless transmission power corresponding to Computer F as f, and a wireless transmission power corresponding to Network TV G as g.

At 402, the router saves the access device identity and the set predetermined wireless transmission power corresponding to the access device identity according to the first setting signal.

For example, according to the first setting signal, the router saves Mobile Phone A and the corresponding predetermined wireless transmission power a, saves Tablet B and the corresponding predetermined wireless transmission power b, saves Computer F and the corresponding predetermined wireless transmission power f, and saves Network TV G and the corresponding predetermined wireless transmission power g, as shown in Table 6 below.

TABLE 6

| Access device identity | Predetermined wireless transmission power |
| --- | --- |
| Mobile Phone A | a |
| Tablet B | b |

TABLE 6-continued

| Access device identity | Predetermined wireless transmission power |
|---|---|
| Computer F | f |
| Network TV G | g |

At 403, the router receives a third setting signal, which is configured to set priorities to the access device identities within target time periods, as shown in Table 7 below.

TABLE 7

| | Target time period | |
|---|---|---|
| Priority | 8:00-20:00 | 0:00-8:00/20:00-24:00 |
| Mobile Phone A | Lowest | Low |
| Tablet B | Highest | Lowest |
| Computer F | Higher | Low |
| Network TV G | Low | Highest |

As shown in Table 7, the priorities of the access device identities in different time periods are different. For example, during the daytime (8:00-20:00), the child needs to use Tablet B to view education programs, the father needs to use the computer to view stocks, and the mother only needs to use Mobile Phone A to browse news. Therefore, during this time period, the priority corresponding to Tablet B is the highest, the priority corresponding to Computer F is higher, and the priority corresponding to Mobile Phone A is the lowest. As another example, during the evening time (0:00-8:00/20:00-24:00), the parents want to watch TV using Network TV G and the child needs to use Tablet B to play games. Therefore, during this period, the priority corresponding to Network TV G is the highest, and the priority corresponding to Tablet B is the lowest.

At 404, the router generates priority correspondence relationships corresponding to target time periods according to the third setting signal. The priority correspondence relationships include the access device identities and the set priorities corresponding to the access device identities, such as, for example, shown in Table 7.

At 405, when an electronic device is connected to a wireless network of the router, the router acquires the access device identity of this device. 405 in the method 400 is similar to 203 in the method 200, and thus detailed description thereof is omitted here.

At 406, the router acquires the predetermined wireless transmission power corresponding to the access device identity.

In some embodiments, when there are two or more access device identities, the router inquires a priority corresponding to each access device identity. More particularly, the router acquires a current time, acquires the priority correspondence relationship corresponding to the current time, and inquires the priority corresponding to each access device identity according to the priority correspondence relationship corresponding to the current time.

Then, the router acquires the predetermined wireless transmission power corresponding to the access device identity having the highest priority. More particularly, the router acquires the access device identity having the highest priority level from the access devices that are currently connected to the router, and acquires the predetermined wireless transmission power corresponding to the access device identity having the highest priority.

For example, four access devices are connected to the router. By referring to, for example, Tables 6 and 7, the router acquires the predetermined wireless transmission power b corresponding to Tablet B having the highest priority in the morning, and acquires the predetermined wireless transmission power g corresponding to the access device identity of Network TV G having the highest priority level in the evening.

At 407, the router adjusts the current transmission power according to the predetermined wireless transmission power. 407 in the method 400 is similar to 307 in the method 300, and thus detailed description thereof is omitted here.

Figure 5:
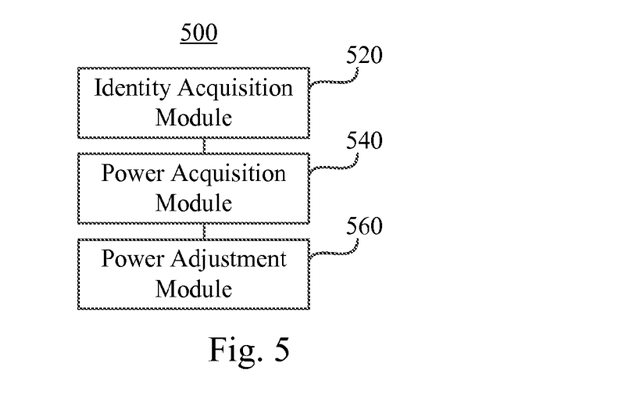
FIG. 5 is a block diagram of a device for adjusting transmission power, according to an exemplary embodiment.

FIG. 5 is a block diagram of an exemplary device 500 for adjusting transmission power consistent with embodiments of the present disclosure. The device 500 may be part or all of an electronic device, for example, a mobile phone, a tablet, an e-book reader, a multimedia player, a personal digital assistant, or the like. As shown in FIG. 5, the device 500 includes an identity acquisition module 520, a power acquisition module 540, and a power adjustment module 560. The identity acquisition module 520 is configured to acquire an access device identity. The power acquisition module 540 is configured to acquire a predetermined wireless transmission power corresponding to the access device identity. Each access device identity corresponds to one predetermined wireless transmission power. The power adjustment module 560 is configured to adjust a current transmission power according to the predetermined wireless transmission power.

Figure 6:
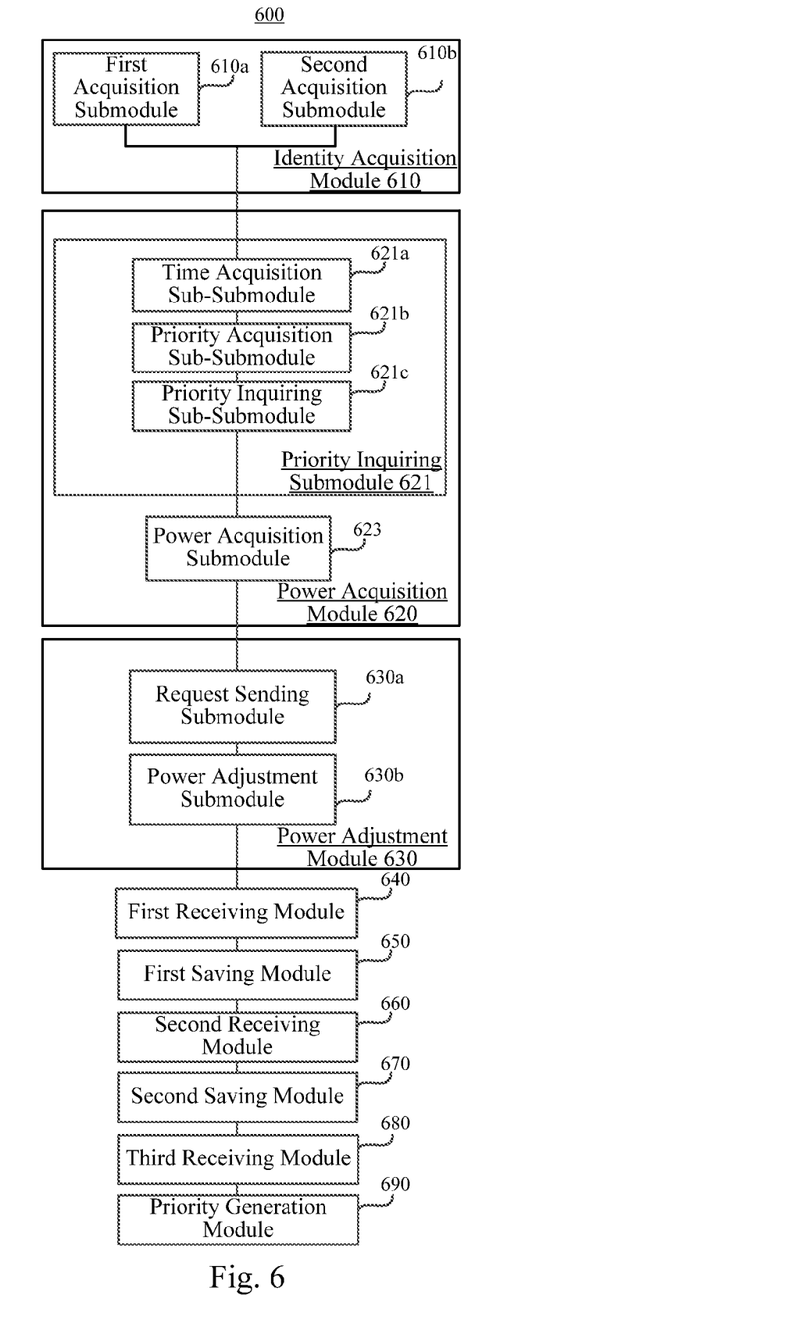
FIG. 6 is a block diagram of a device for adjusting transmission power, according to another exemplary embodiment.

FIG. 6 is a block diagram of another exemplary device 600 for adjusting transmission power consistent with embodiments of the present disclosure. The device 600 may be part or all of an electronic device, for example, a mobile phone, a tablet, an e-book reader, a multimedia player, a personal digital assistant, or the like. As shown in FIG. 6, the device 600 includes an identity acquisition module 610, a power acquisition module 620, a power adjustment module 630, a first signal receiving module 640, a first saving module 650, a second signal receiving module 660, a second saving module 670, a third signal receiving module 680, and a priority generation module 690.

In some embodiments, as shown in FIG. 6, the power acquisition module 620 includes a priority inquiring submodule 621 and a power acquisition submodule 623. The priority inquiring submodule 621 is configured to, when there are two or more access device identities, inquire a priority corresponding to each access device identity. The power acquisition submodule 623 is configured to acquire a predetermined wireless transmission power corresponding to the access device identity having the highest priority.

In some embodiments, as shown in FIG. 6, the priority inquiring submodule 621 includes a time acquisition sub-submodule 621a, a priority acquisition sub-submodule 621b, and a priority inquiring sub-submodule 621c. The time acquisition sub-submodule 621a is configured to acquire a current time. The priority acquisition sub-submodule 621b is configured to acquire a priority correspondence relationship corresponding to the current time. The priority correspondence relationship is a correspondence relationship between access device identities and priorities. The priority inquiring sub-submodule 621c is configured to inquire the priority corresponding to each access device identity from the priority correspondence relationship corresponding to the current time.

The first receiving module 640 is configured to receive a first setting signal, which is configured to set a wireless transmission power corresponding to an access device identity.

The first saving module 650 is configured to save the access device identity and the set predetermined wireless transmission power corresponding to the access device identity according to the first setting signal.

The second receiving module 660 is configured to receive a second setting signal, which is configured to set priorities corresponding to access device identities.

The second saving module 670 is configured to save the access device identities and the corresponding priorities according to the second setting signal.

The third receiving module 680 is configured to receive a third setting signal, which is configured to set priorities corresponding to access device identities within target time periods.

The priority generation module 690 is configured to generate a priority correspondence relationships corresponding to the target time periods according to the third setting signal. The priority correspondence relationships include the access device identities and the set priorities corresponding to the access device identities.

In some embodiments, as shown in FIG. 6, the identity acquisition module 610 includes a first acquisition submodule 610a or a second acquisition submodule 610b. The first acquisition submodule 610 is configured to acquire the access device identity of an access device after the access device is successfully connected to the wireless network. The second acquisition submodule 610b is configured to acquire the access device identity of each access device that has been connected to the wireless network after every predetermined time interval.

In some embodiments, as shown in FIG. 6, the power adjustment module 630 includes a request sending submodule 630a and a power adjustment submodule 630b. The request sending submodule 630a is configured to send an adjustment request to the access device corresponding to a selected access device identity or an administrator device. The selected access device or the administrator device returns an adjustment response back according to the adjustment request. The power adjustment submodule 630b is configured to, when the received adjustment response indicates that the adjustment is allowed, adjust the current transmission power to the predetermined wireless transmission power.

Figure 7:
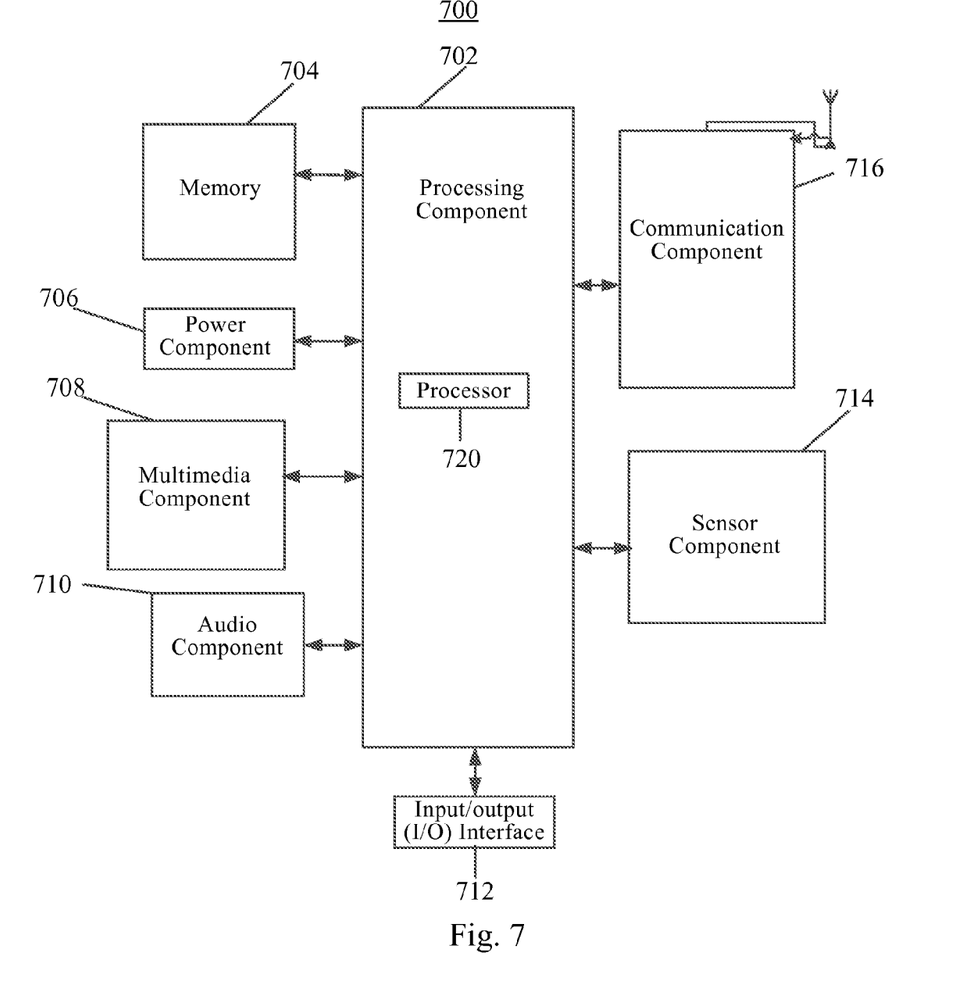
FIG. 7 is a block diagram of a device according to another exemplary embodiment.

FIG. 7 is a block diagram of another exemplary device 700 for adjusting transmission power consistent with embodiments of the present disclosure. For example, the device 700 may be a mobile phone, a computer, a digital broadcast terminal, a messaging device, a gaming console, a tablet, a medical device, exercise equipment, a personal digital assistant, or the like.

Referring to FIG. 7, the device 700 includes one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the methods consistent with embodiments of the present disclosure.

Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, 3G, 4G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods consistent with embodiments of the present disclosure.

In exemplary embodiments, there is also provided a non-transitory computer readable storage medium, such as included in the memory 704, storing instructions executable by the processor 720 in the device 700, for performing the methods for adjusting transmission power consistent with embodiments of the present disclosure. For example, the non-transitory computer-readable storage medium may be a ROM, a RAM, a CD-ROM, a magnetic tape, a floppy disc, an optical data storage device, or the like.

Operations of devices consistent with embodiments of the present disclosure are similar to the methods described above, and thus the detailed descriptions thereof are omitted here.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for adjusting transmission power of a gateway device, comprising:
   acquiring an access device identity;
   acquiring a predetermined transmission power corresponding to the access device identity;
   sending a transmission power adjustment request to an access device corresponding to the access device identity; and
   adjusting a current transmission power of the gateway device according to the predetermined transmission power based on a response to the transmission power adjustment request received from the access device.

2. The method according to claim 1, wherein acquiring the predetermined transmission power includes inquiring at least one saved access device identity and at least one saved predetermined transmission power corresponding to the at least one saved access device identity, to acquire the predetermined transmission power corresponding to the acquired access device identity.

3. The method according to claim 1, wherein:
   acquiring the access device identity includes acquiring two or more access device identities, and
   acquiring the predetermined transmission power includes:
      inquiring priorities corresponding to the two or more access device identities; and
      acquiring the predetermined transmission power corresponding to the access device identity having a highest priority.

4. The method according to claim 3, wherein inquiring the priorities includes inquiring from saved access device identities and saved priorities corresponding to the saved access device identities.

5. The method according to claim 3, wherein inquiring the priorities includes:
   acquiring a current time;
   acquiring a priority correspondence relationship corresponding to the current time, the priority correspondence relationship being a correspondence relationship between the access device identities and the priorities; and
   inquiring the priorities from the priority correspondence relationship.

6. The method according to claim 1, wherein acquiring the access device identity includes acquiring, after an access device is successfully connected to the gateway device, the access device identity of the access device.

7. The method according to claim 1, wherein acquiring the access device identity includes acquiring the access device identity of each access device connected to the gateway device at every predetermined time interval.

8. The method according to claim 1, wherein the transmission power adjustment request is a first transmission power adjustment request, and adjusting the current transmission power includes:
   sending a second transmission power adjustment request to an administrator device preset by a user for responding to the second transmission power adjustment request, the administrator device being configured to return an adjustment response to the gateway device according to the second transmission power adjustment request; and
   adjusting, if the adjustment response indicates that a transmission power adjustment is allowed, the current transmission power to the predetermined transmission power.

9. A gateway device for adjusting transmission power, comprising:
- a processor; and
- a non-transitory computer-readable storage medium storing instructions that, when executed by the processor, cause the processor to:
  - acquire an access device identity;
  - acquire a predetermined transmission power corresponding to the access device identity;
  - send a transmission power adjustment request to an access device corresponding to the access device identity; and
  - adjust a current transmission power of the gateway device according to the predetermined transmission power based on a response to the transmission power adjustment request received from the access device.

10. The gateway device according to claim 9, wherein the instructions further cause the processor to inquire at least one saved access device identity and at least one saved predetermined transmission power corresponding to the at least one saved access device identity, to acquire the predetermined transmission power corresponding to the acquired access device identity.

11. The gateway device according to claim 9, wherein the instructions further cause the processor to:
- acquire two or more access device identities;
- inquire priorities corresponding to the two or more access device identities; and
- acquire the predetermined transmission power corresponding to the access device identity having a highest priority.

12. The gateway device according to claim 11, wherein the instructions further cause the processor to inquire from saved access device identities and saved priorities corresponding to the saved access device identities.

13. The gateway device according to claim 11, wherein the instructions further cause the processor to:
- acquire a current time;
- acquire a priority correspondence relationship corresponding to the current time, the priority correspondence relationship being a correspondence relationship between the access device identities and the priorities; and
- inquire the priorities from the priority correspondence relationship.

14. The gateway device according to claim 9, wherein the instructions further cause the processor to acquire, after an access device is successfully connected to the gateway device, the access device identity of the access device.

15. The gateway device according to claim 9, wherein the instructions further cause the processor to acquire the access device identity of each access device connected to the gateway device at every predetermined time interval.

16. The gateway device according to claim 9, wherein the transmission power adjustment request is a first transmission power adjustment request, and the instructions further cause the processor to:
- send a second transmission power adjustment request to an administrator device preset by a user for responding to the second transmission power adjustment request, the administrator device being configured to return an adjustment response to the gateway device according to the second transmission power adjustment request; and
- adjust, if the adjustment response indicates that a transmission power adjustment is allowed, the current transmission power to the predetermined transmission power.

17. A non-transitory computer-readable storage medium storing instructions that, when executed by a processor in a gateway device, cause the gateway device to:
- acquire an access device identity;
- acquire a predetermined transmission power corresponding to the access device identity;
- send a transmission power adjustment request to an access device corresponding to the access device identity; and
- adjust a current transmission power of the gateway device according to the predetermined transmission power based on a response to the transmission power adjustment request received from the access device.

* * * * *